United States Patent
Noll et al.

(10) Patent No.: US 6,642,850 B1
(45) Date of Patent: Nov. 4, 2003

(54) INDICATING DEVICE

(75) Inventors: Heinrich Noll, Gross-Umstadt (DE);
Helmut Wolf, Hochheim (DE);
Thorsten Wend, Frankfurt (DE);
Matthias Rein, Rossdorf (DE)

(73) Assignee: Mannesmann VDO AG, Frankfurt (DE)

( * ) Notice: Subject to any disclaimer, the term of this patent is extended or adjusted under 35 U.S.C. 154(b) by 312 days.

(21) Appl. No.: 09/644,964

(22) Filed: Aug. 23, 2000

(30) Foreign Application Priority Data

Sep. 7, 1999 (DE) .......................................... 199 42 737
Jul. 31, 2000 (DE) .......................................... 100 37 361

(51) Int. Cl.⁷ .............................................. G08B 5/00
(52) U.S. Cl. ............................ 340/815.4; 340/815.45; 362/23; 362/26
(58) Field of Search ........................ 340/815.4, 815.45, 340/525, 438, 461; 116/284, 288, 309, 62.1; 362/23, 26, 29, 30

(56) References Cited

U.S. PATENT DOCUMENTS 4,521,078 A * 6/1985 Baeger ........................ 350/334
4,878,453 A * 11/1989 Inoue et al. ................. 116/288
5,938,311 A * 8/1999 Takao ........................... 362/26

* cited by examiner

Primary Examiner—Anh La
(74) Attorney, Agent, or Firm—Martin A. Farber

(57) ABSTRACT

In an indicating instrument, especially in a motor vehicle, having a cover glass (4) that appears dark and, under incident light, prevents any view of a dial (3) arranged at a distance behind it, and having at least one light source (8) arranged behind the dial (3) to transilluminate said dial (3) and therefore render the dial (3) visible through the cover glass (4). In order to prevent the dial (3) becoming visible when there is only incident light, the transmission of the dial (3) is matched to the transmission of the cover glass (4). To this end, in particular, the dial (3) is provided with a low transmission.

15 Claims, 1 Drawing Sheet

INDICATING DEVICE

FIELD AND BACKGROUND OF THE INVENTION

The invention relates to an indicating instrument, especially in a motor vehicle, having a cover glass that appears dark and, under incident light, rules out any view of a dial arranged at a distance behind it, and having at least one light source arranged behind the dial to transilluminate said dial and therefore render the dial visible through the cover glass.

Indicating instruments of the above type are known under the term "black-panel design" and, to some extent, have entered practical use. The black-panel effect is realized by the transmissivity of the cover glass being reduced to 20% to 40%, in the manner of sunglasses, by means of a color print. In the known indicating instruments, the dial is designed to be light, so that it appears easily visible to the viewer under transmitted-light illumination, in spite of the dark front glass.

It has been shown that, in order to implement a good black-panel effect, the cover glass has to be relatively highly colored, in order that the dial appears invisible when the transmitted-light illumination is switched off. However, since as a rule no incandescent lamps can be used for the illumination, since they produce a great deal of heat, and light-emitting diodes are therefore preferred, there is quite a restriction relating to the available luminous intensity. The aim is therefore to permit the transmitted light to pass from the light source to the viewer with the lowest possible losses. However, this objective is opposed by the desire not to permit the dial to become visible merely as a result of incident light.

SUMMARY OF THE INVENTION

The invention is based on the object of configuring an indicating instrument of the type mentioned at the beginning in such a way that a black-panel effect is implemented without undesirably high luminous intensities being needed for the transmitted-light illumination.

According to the invention, this problem is achieved in that, in order to prevent the dial from becoming visible when there is only incident light, the transmission of the dial is matched to the transmission of the cover glass.

As a result of the indicating instrument according to the invention, two parameters are available to bring about the black-panel effect. Matching the dial to the transmission behavior of the cover glass makes it possible to reduce the transmission of the cover glass relatively slightly. However, the incident light which then passes through the cover glass onto the dial does not lead to the dial becoming visible, since the latter, due to the invention, has its transmission matched to the cover glass in such a way that light incident from the outside does not pass back through the cover glass to the viewer. Overall, this matching according to the invention allows a good black-panel effect to be achieved, without unworkable requirements having to be placed on the luminous intensity of the light source.

The black-panel effect can be reinforced in a simple way by the transmission of the cover glass being matched to the visible spectrum of the light source and, for example, by selecting a high transmission for the wavelength of the light source but a low transmission for other wavelengths. As a result, incident light can be kept back from the dial without the transmission of the light originating from the light source being restricted.

The indicating instrument is configured particularly simply if the cover glass has a dark coloration which permits a dial that reflects well toward the cover glass still to appear visible, and therefore has a low transmission, and if the dial is designed to reflect poorly. In the case of such an indicating instrument, under incident light, a relatively large amount of light may strike the dial without it being reflected back to the viewer, since, as a result of its dark coloration, the dial reflects only a little light.

The poor reflection of the dial may be implemented very simply by the dial being designed to be dark.

Alternatively, however, it is also possible for the dial to be designed to reflect poorly as a result of its surface form. To this end, the dial can, for example, be provided with a very highly roughened surface.

A further contribution to reducing the luminous intensity is made by the cover glass and the dial having a visible-wavelength selective coloration.

In the case of a dial with a negative display, it is possible for the light from the light source that reaches the non-translucent areas to be used for the transillumination of the translucent areas as well if, on its side facing the light source, the dial has white printing in areas that are not to be transilluminated. By this means, the light which reaches the non-translucent areas is reflected and, following renewed reflection, can reach the translucent areas.

Instead of restricting the reflective capacity of the dial, according to another configuration of the invention, it is also possible to provide for the cover glass to be provided with a polarization filter, and for the dial to be designed to be highly reflective. In such a design, use is made of the effect that light passing through a polarization filter cannot pass back through the polarization filter following a reflection.

The light source used for the indicating instrument can be a conventional cold-cathode tube. This has a high luminous intensity and, by means of appropriate curvature, can extend over the area to be illuminated.

Cold-cathode tubes have only a low luminous intensity at low temperatures and can be dimmed only with difficulty. This can be rectified if, according to another configuration of the invention, provision is made for the light source used to be a large number of individual light-emitting diodes.

A particularly low luminous intensity of the light source is needed if the dial is designed with a positive display.

In an indicating instrument in which the dial is designed with a negative display, optimum illumination can be implemented with a low current consumption by means of light-emitting diodes if a light-emitting diode is situated behind each scale mark and/or behind each number or each indicating symbol, as a light source.

BRIEF DESCRIPTION OF THE DRAWING

The invention permits various embodiments. In order to illustrate its basic principle, further, three of these embodiments are illustrated in the figures of the drawing and will be described below. In the drawing.

DETAILED DESCRIPTION OF THE PREFERRED EMBODIMENT

Figure 1:
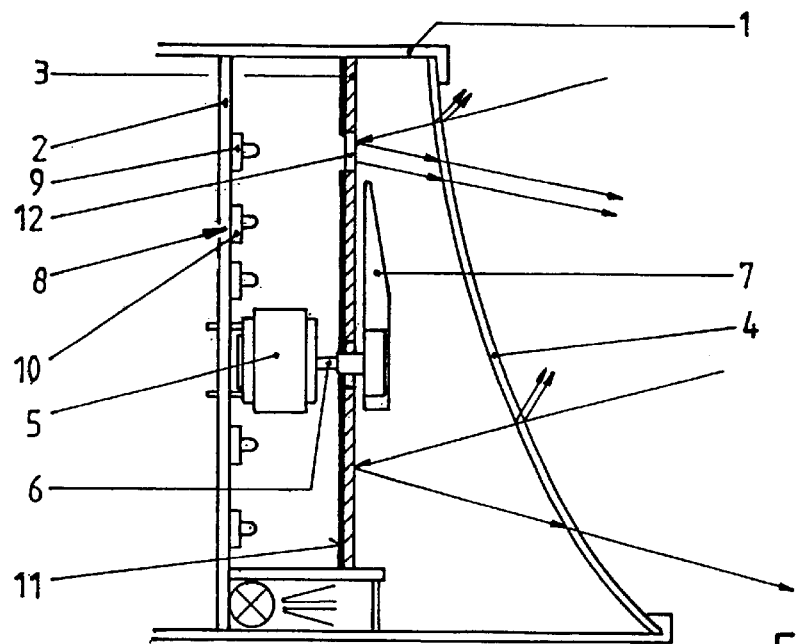
FIG. 1 shows a vertical section through an indicating instrument according to the invention.

The indicating instrument shown in FIG. 1 has a housing 1, which holds a printed circuit board 2, a dial 3 and a cover glass 4. Arranged on the printed circuit board 2 is a pointer drive 5 with a pointer shaft 6, which bears a pointer 7. Also located on the printed circuit board 2 are a number of light sources 8, which are formed by light-emitting diodes 9, 10.

What is important for the invention is that the transmission of the dial 3 is reduced by black printing 11. As well as this, the transmission of the cover glass 4 is reduced by being colored, for example. The reductions in the transmission of the cover glass 4 and the dial 3 are matched to each other. In this embodiment, the dial 3 is designed for a negative display. It therefore has symbol areas 12 which are not covered by the black printing 11, behind which in each case one of the light-emitting diodes 9 can be arranged, so that the respective light is able to pass directly through the symbol area 12. In FIG. 1, arrows show that the incident light is reflected back considerably reduced to the outside, so that the black-panel effect occurs, while the transmitted light from the light sources 8 easily reaches the viewer.

Figure 2:
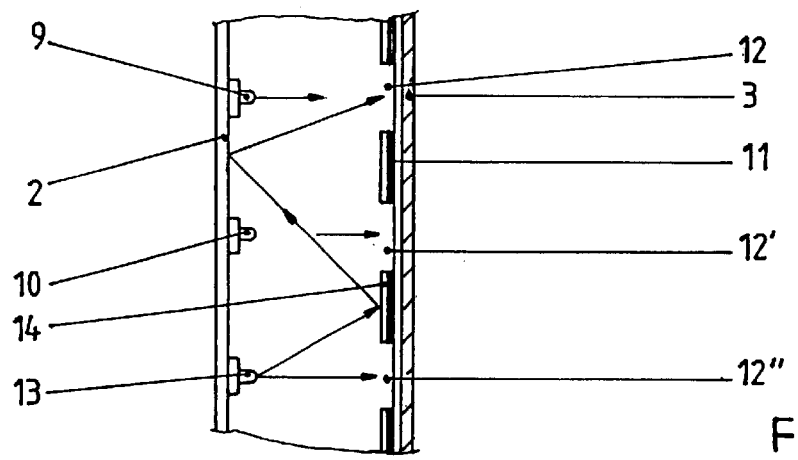
FIG. 2 shows a vertical section through a sub-area of a second embodiment of the indicating instrument.

FIG. 2 shows the printed circuit board 2 with the light-emitting diodes 9, 10 and a further light-emitting diode 13. In addition, the dial 3 is shown with the symbol areas 12, 12', 12". Between the symbol areas 12, 12', 12", the black printing 11 is applied to the rear of the dial 3. Toward the light-emitting diodes 9, 10, 13, said black printing is covered by white printing 14. As a result, light which reaches the white printing 14 is reflected and is nevertheless ultimately available to transilluminate the symbol areas 12, 12' and 12", which has been illustrated by arrows for the light-emitting diode 13.

Figure 3:
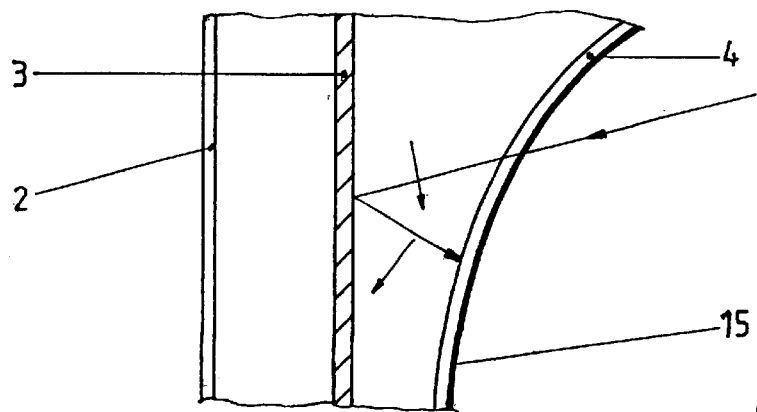
FIG. 3 shows a vertical section through a third embodiment of an indicating instrument according to the invention.

In the embodiment according to FIG. 3, the cover glass 4 is provided with a polarization filter 15, which can be designed as a thin sheet. By this means, the light reflected from the dial 3 is no longer capable of passing back through the polarization filter 15 to the viewer.

We claim:

1. An indicating instrument, comprising
   a cover glass,
   a dial arranged at a distance behind the cover glass, the cover glass appearing dark and, under incident light, eliminating any view of said dial arranged behind said cover glass, and
   at least one light source arranged behind the dial to transilluminate said dial such that the dial is visible through the cover glass, wherein,
   transmission of the dial (3) is matched to transmission of said cover glass (4) so as to prevent the dial (3) from becoming visible when there is only incident light.

2. The indicating instrument as claimed in claim 1, wherein the transmission of the cover glass (4) is matched to the visible spectrum of said light source (8).

3. The indicating instrument as claimed in claim 1, wherein the cover glass (4) has a dark coloration which permits said dial (3) that reflects well toward the cover glass (4) still to appear visible, and therefore has a low transmission, and wherein the dial (3) is made to reflect poorly.

4. The indicating instrument as claimed in claim 3, wherein the dial (3) is made so as to be dark.

5. The indicating instrument as claimed in claim 3, wherein the dial (3) reflects poorly as a result of its surface form.

6. The indicating instrument as claimed in claim 1, wherein the cover glass (4) and the dial (3) have a visible-wavelength selective coloration.

7. The indicating instrument as claimed in claim 1, wherein, on its side facing the light source (8), the dial (3) has white printing (14) in areas that are not to be transilluminated.

8. The indicating instrument as claimed in claim 1, wherein the cover glass (4) is provided with a polarization filter (15), and the dial (3) is made to be highly reflective.

9. The indicating instrument as claimed in claim 1, wherein the light source (8) is a cold-cathode tube.

10. The indicating instrument as claimed in claim 1, wherein the at least one light source (8) comprises a large number of individual light-emitting diodes (9, 10, 13).

11. The indicating instrument as claimed in claim 1, wherein the dial (3) is designed with a positive display.

12. The indicating instrument as claimed in claim 1, wherein the dial is designed with a negative display, and wherein as said at least one light source there is a light-emitting diode (9, 10, 13) situated behind each scale mark and/or behind each number or each indicating symbol (symbol areas 12, 12', 12").

13. The indicating instrument as claimed in claim 2, wherein the cover glass (4) has a dark coloration which permits said dial (3) that reflects well toward the cover glass (4) still to appear visible, and therefore has a low transmission, and wherein the dial (3) is made to reflect poorly.

14. The indicating instrument as claimed in claim 2, wherein the cover glass (4) is provided with a polarization filter (15), and the dial (3) is made to be highly reflective.

15. The indicating instrument as claimed in claim 1, wherein the indicating instrument is in a motor vehicle.

* * * * *